(12) United States Patent
Nishimura

(10) Patent No.: US 7,356,007 B2
(45) Date of Patent: Apr. 8, 2008

(54) CDMA RECEIVER AND METHOD OF JUDGING TFCI CANDIDATES OF THE SAME

(75) Inventor: Tomoyuki Nishimura, Tokyo (JP)

(73) Assignee: NEC Corporation, Tokyo (JP)

(*) Notice: Subject to any disclaimer, the term of this patent is extended or adjusted under 35 U.S.C. 154(b) by 631 days.

(21) Appl. No.: 10/846,661

(22) Filed: May 17, 2004

(65) Prior Publication Data

US 2004/0228307 A1 Nov. 18, 2004

(30) Foreign Application Priority Data

May 15, 2003 (JP) ............................. 2003-137776

(51) Int. Cl.
*H04B 7/216* (2006.01)
(52) U.S. Cl. .................. 370/335; 370/320; 370/322; 370/329; 370/341; 455/450; 455/509; 455/516; 455/131; 455/150.1
(58) Field of Classification Search ............... 370/320, 370/322, 329, 341; 455/450, 509, 516, 131, 455/150.1
See application file for complete search history.

(56) References Cited

U.S. PATENT DOCUMENTS

| 6,175,590 | B1 | 1/2001 | Stein |
| 6,341,125 | B1 * | 1/2002 | Hong et al. ............... 370/335 |
| 2002/0108090 | A1 * | 8/2002 | Ariel et al. ............... 714/792 |

FOREIGN PATENT DOCUMENTS

| CN | 1397122 A | 2/2003 |
| EP | 1 248 403 | 10/2002 |
| JP | 2002-246949 | 8/2002 |
| JP | EP-1248403 | * 10/2002 |
| JP | 2003-32146 | 1/2003 |
| JP | EP-1286489 | * 2/2003 |

* cited by examiner

*Primary Examiner*—Steve M. D'Agosta
(74) *Attorney, Agent, or Firm*—Young & Thompson

(57) ABSTRACT

In a CDMA receiver, the TFCI decoding error is reduced. When the difference between TFCI correlation values is small and hence TFCI candidates are less credible, data is decoded using transport format information according to a plurality of TFCI having a high TFCI correlation value to select an appropriate TFCI using to a CRC judge result. Data is decoded according to the appropriate TFCI and is sent to the higher layer. Therefore, data decoded according to correct transfer format information can be reported to the upper layer. This resultantly keeps high utilization efficiency of finite wireless resources.

10 Claims, 6 Drawing Sheets

F I G. 2
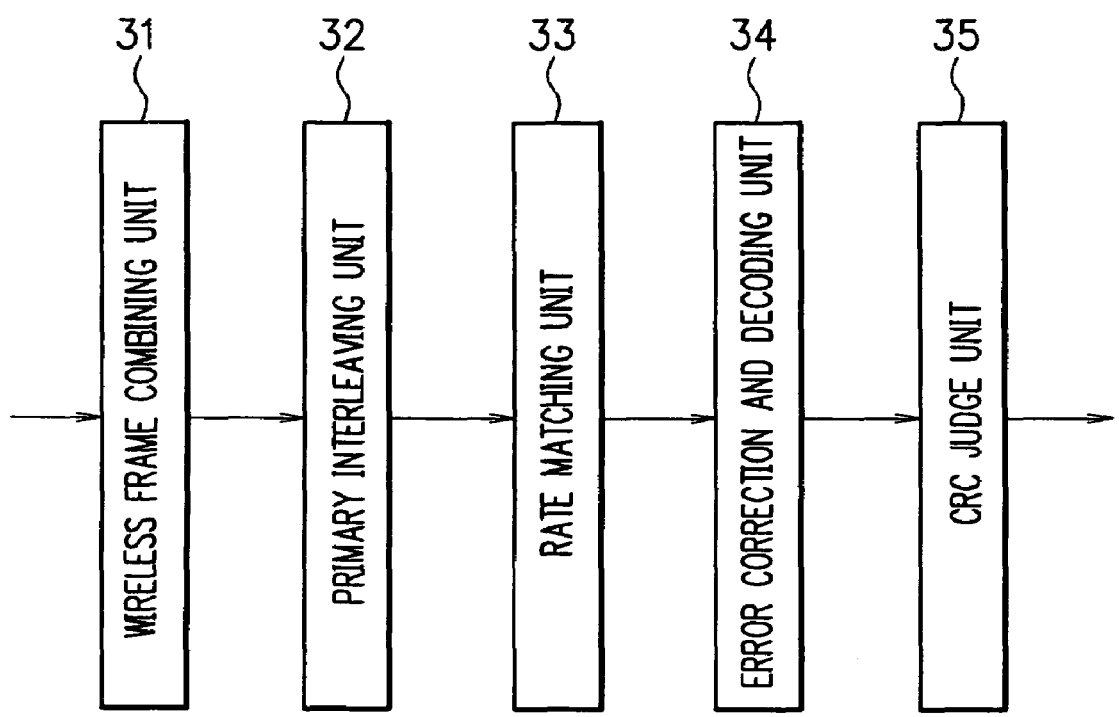

CDMA RECEIVER AND METHOD OF JUDGING TFCI CANDIDATES OF THE SAME

BACKGROUND OF THE INVENTION

1. Field of the Invention

The present invention relates to a coded division multiple access (CDMA) receiver for use with a mobile communication system of CDMA type and a method of judging transport format combination indicator (TFCI) candidates of the same.

2. Description of the Prior Art

In a CDMA receiver described, for example, in "W-CDMA Mobile Communication Method" supervised by Keiji Tachikawa and published from Maruzen, a data decoding operation is conducted by a decoder unit including constituent components generally shown in FIG. 2 such as a wireless frame combining section 31, a primary interleaving section 32, a rate matching section 33, an error correction and decoding section 34 for viterbi and turbo decoding schemes, and a cyclic redundancy check (CRC) unit 35. The operation requires transport format information indicating a block size and the number of blocks for a unit of data to be decoded. The transport format information is determined for each channel called a transport channel and takes a value variable with a period called a transmission time interval. This interval has a value represented by an integral multiplex of a wireless frame length. The length is a minimum value of the data unit for a wireless interface.

In a wireless zone, a plurality of transport channel are multiplexed for transmission, and hence a wireless frame thus transmitted includes a transport format combination indicator (TFCI) in addition to the information signal. The indicator includes a value to indicate a combination of format information of each transport channel. When a TFCI signal is received, it is required for the decoder of the CDMA receiver before starting the decoding operation to check the TFCI signal to determine the format information necessary for the decoding of signals on each transport channel.

TFCI is represented by a number identifying a data transmission format, i.e., a data block size and the number of blocks. This means that the TFCI number determines a data rate. According to the standards of the third generation mobile communication system stipulated by the 3rd generation partnership project (3GPP), TFCI is indicated by one of 1024 numbers ranging from 0 to 1023 and is converted for transmission into a code word (TFCI code sequence) corresponding to each associated number.

In the CDMA receiver having received the TFCI signal, the decoder unit obtains 1024 correlation values between the TFCI code sequences of the predetermined 1024 kinds and the TFCI signal actually received and determines a maximum value of the correlation values to obtain a number corresponding to the correlation value. The decoder regards the number as that of the received TFCI. The decoder then decodes data according to a transport format identified by the TFCI number.

The TFCI signal is mapped onto one 30-bit code word and is decoded according to the Reed-Muller code system for transmission. The TFCI decoding algorithm cannot determine whether or not the decoded TFCI is correct. In other words, even when the TFCI is decoded in a wrong way, the system carries out the decoding operation on assumption that the obtained TFCI indicates a correct state of each channel for a wireless frame. Therefore, the decoder uses wrong multiplexing parameters and conducts the rate matching and the error correction and decoding operation in a wrong way. As a result, the wireless frame data of each transport channel is lost. The error is detected only by the subsequent step of the CRC unit.

In this connection, Japanese Patent Laid-Open Ser. Nos. 2002-246949 and 2003-32146 describe inventions to increase signal receiving precision.

As above, The TFCI decoding algorithm cannot determine whether or not the decoded TFCI is correct. There consequently arises a problem that the system executes the processing in a wrong way using the wrong TFCI, and hence the wireless frame data is lost for each transport channel.

Retransmission of wireless frame data lowers efficiency of use of wireless resources.

SUMMARY OF THE INVENTION

It is therefore an object of the present invention, which has been devised to solve the problem, to provide a CDMA receiver in which the TFCI decoding error is reduced and a method of judging TFCI candidates of the same.

To achieve the object in accordance with the present invention, there is provided a CDMA receiver for use with a CDMA mobile communication system including a transport format combination indicator (TFCI) decoding unit for obtaining correlation values between a TFCI signal associated with transfer format information of data and a predetermined TFCI code sequence, and a TFCI correlation judging unit for comparing a first threshold value with a correlation value distance represented by a difference between a TFCI correlation value of a TFCI candidate having a largest TFCI correlation value obtained by the TFCI decoding unit and a TFCI correlation value of a TFCI candidate having a next largest TFCI correlation value obtained by the TFCI decoding unit and conducting a control operation in which when the correlation value distance is less than the first threshold value, decoding processing of decoding data of a physical channel into a data of a transport channel according to the transport format information of the TFCI candidate is concurrently executed using transport format information items of a plurality of TFCI candidates.

In the CDMA receiver, when the correlation value distance is less than the first threshold value, the decoding processing is concurrently executed using transport format information items of the TFCI candidates. The receiver further includes a transport channel format judging unit for making a check to determine whether or not a cyclic redundancy check (CRC) judge result obtained from the decoding processing is normal and reporting to a higher layer the CRC judge result and data of a transfer channel obtained by decoding data of a physical channel according to transfer format information associated with a TFCI candidate for which the CRC judge result is normal.

In accordance with the present invention, there is provided a CDMA receiver for use with a CDMA mobile communication system comprising including a TFCI decoding unit for obtaining correlation values between a TFCI signal associated with transfer format information of data and a predetermined TFCI code sequence, a TFCI correlation judging unit for comparing a first threshold value with a correlation value distance represented by a difference between a TFCI correlation value of a TFCI candidate having a largest TFCI correlation value obtained by the TFCI decoding unit and a TFCI correlation value of a TFCI candidate having a next largest TFCI correlation value obtained by the TFCI decoding unit and conducting a control operation in which when the correlation value distance is less than the first threshold value, decoding processing of decoding data of a physical channel into a data of a transport channel according to the transport format information of the TFCI candidate is concurrently executed using transport format information items of a plurality of TFCI candidates, a first demultiplexing unit for dividing data of a physical channel into a number of blocks and a block size of a transport channel according to the transport format information of the TFCI candidate having the largest TFCI correlation value and delivering data of the transport channel, a first decoding unit for decoding the data of the transport channel from the first demultiplexing unit and outputting data thus decoded and a CRC judge result, a second demultiplexing unit for dividing data of a physical channel into a number of blocks and a block size of a transport channel according to the transport format information of the TFCI candidate having the next largest TFCI correlation value and delivering data of the transport channel, a second decoding unit for decoding the data of the transport channel from the second demultiplexing unit and outputting data thus decoded and a CRC judge result, and a transport channel format judging unit for determining whether or not each of the CRC judge results obtained respectively from the first and second decoding units is normal and reporting to a higher layer the CRC judge result and data of a transfer channel obtained by decoding data of a physical channel according to transfer format information associated with a TFCI candidate for which the CRC judge result is normal.

In the CDMA receiver, the TFCI correlation judging unit conducts a control operation to inhibit operation of the second demultiplexing unit and the second decoding unit when the correlation value distance is larger than the first threshold value. The TFCI correlation judging unit delivers the data of the transport channel by the first demultiplexing unit, the data being obtained by dividing the data of a physical channel into a number of blocks and a block size of the transport channel according to the transport format information of the TFCI candidate having the largest TFCI correlation value. The TFCI correlation judging unit decodes by the first decoding unit the data of the transport channel from the first demultiplexing unit and thereby outputs data thus decoded and a CRC judge result. The transport channel format judging unit reports the data decoded by the first decoding unit and the CRC judge result to the higher layer.

In the CDMA receiver, the TFCI correlation judging unit compares the TFCI correlation value of the TFCI candidate having the largest TFCI correlation value with a second threshold value and then compares, when the TFCI correlation value is smaller than the second threshold value, a difference between the TFCI correlation value of the TFCI candidate having the largest TFCI correlation value obtained by the TFCI decoding unit and that of the TFCI candidate having the next largest TFCI correlation value with the first threshold value. The TFCI correlation judging unit thereby determines whether or not the decoding processing is to be concurrently executed.

In accordance with the present invention, there is provided a method of judging TFCI candidates of a CDMA receiver for use with a CDMA mobile communication system. The method includes a TFCI decoding step of obtaining correlation values between a TFCI signal associated with transfer format information of data and a predetermined TFCI code sequence, a correlation value distance comparing step of comparing a first threshold value with a correlation value distance represented by a difference between a TFCI correlation value of a TFCI candidate having a largest TFCI correlation value obtained by the TFCI decoding step and a TFCI correlation value of a TFCI candidate having a next largest TFCI correlation value obtained by the TFCI decoding step, and a step of conducting, when the correlation value distance is less than the first threshold value, an operation in which decoding processing of decoding data of a physical channel into a data of a transport channel according to the transport format information of the TFCI candidate is concurrently executed using transport format information items of a plurality of TFCI candidates.

The method of judging TFCI candidates of a CDMA receiver further includes a step of concurrently executing, when the correlation value distance is less than the first threshold value, the decoding processing using transport format information items of the TFCI candidates, and a transport channel format judging step of making a check to determine whether or not a CRC judge result obtained from the decoding processing is normal and reporting to a higher layer the CRC judge result and data of a transfer channel obtained by decoding data of a physical channel according to transfer format information associated with a TFCI candidate for which the CRC judge result is normal.

In accordance with the present invention, there is provided a method of judging TFCI candidates of a CDMA receiver for use with a CDMA mobile communication system. The method includes a TFCI decoding step of obtaining correlation values between a TFCI signal associated with transfer format information of data and a predetermined TFCI code sequence, a correlation value distance comparing step of comparing a first threshold value with a correlation value distance represented by a difference between a TFCI correlation value of a TFCI candidate having a largest TFCI correlation value obtained by the TFCI decoding step and a TFCI correlation value of a TFCI candidate having a next largest TFCI correlation value obtained by the TFCI decoding step, a first demultiplexing step of dividing data of a physical channel into a number of blocks and a block size of a transport channel according to the transport format information of the TFCI candidate having the largest TFCI correlation value and delivering data of the transport channel, a first decoding step of decoding the data of the transport channel from the first demultiplexing step and outputting data thus decoded and a CRC judge result, a second demultiplexing step of dividing data of a physical channel into a number of blocks and a block size of a transport channel according to the transport format information of the TFCI candidate having the next largest TFCI correlation value and delivering data of the transport channel, a second decoding step of decoding the data of the transport channel from the second demultiplexing step and outputting data thus decoded and a CRC judge result, a concurrent processing indicating step of indicating, when the correlation value distance comparing step determines that the correlation value distance is less than the first threshold value, concurrent execution of first decoding processing by the first demultiplexing step and the first decoding step and second decoding processing by the second demultiplexing step and the second decoding step, and a transport channel format judging step of determining whether or not each of the CRC judge results obtained respectively from the first and second decoding steps is normal and reporting to a higher layer the CRC judge result and data of a transfer channel obtained by decoding data of a physical channel according to transfer format information associated with a TFCI candidate for which the CRC judge result is normal.

In the method of judging TFCI candidates of a CDMA receiver, the concurrent processing indicating step further includes a step of inhibiting execution the second demultiplexing step and the second decoding step when the correlation value distance is larger than the first threshold value. The first demultiplexing step further includes a step of delivering the data of the transport channel, the data being obtained by dividing the data of a physical channel into a number of blocks and a block size of the transport channel according to the transport format information of the TFCI candidate having the largest TFCI correlation value. The first decoding step decodes the data of the transport channel from the first demultiplexing step and thereby outputs data thus decoded and a CRC judge result. The transport channel format judging step reports the data decoded by the first decoding step and the CRC judge result to the higher layer.

The method of judging TFCI candidates of a CDMA receiver further includes a TFCI correlation value judging step of comparing the TFCI correlation value of the TFCI candidate having the largest TFCI correlation value with a second threshold value. The correlation value distance comparing step compares, when the TFCI correlation value judging step determines that the TFCI correlation value is smaller than the second threshold value, a difference between the TFCI correlation value of the TFCI candidate having the largest TFCI correlation value and that of the TFCI candidate having the next largest TFCI correlation value with the first threshold value and thereby determines whether or not the decoding processing is to be concurrently executed.

BRIEF DESCRIPTION OF THE DRAWINGS

The objects and features of the present invention will become more apparent from the consideration of the following detailed description taken in conjunction with the accompanying drawings in which:

FIG. 2 is a block diagram showing a configuration of a first decoder unit 9 and a second decoder unit 12;

DESCRIPTION OF THE EMBODIMENTS

Referring next to the accompanying drawings, description will be given in detail of an embodiment of a CDMA receiver and a method of judging TFCI candidates of the same. FIGS. 1 to 6 show embodiments of a CDMA receiver and a method of judging TFCI candidates of the same.

Figure 1:
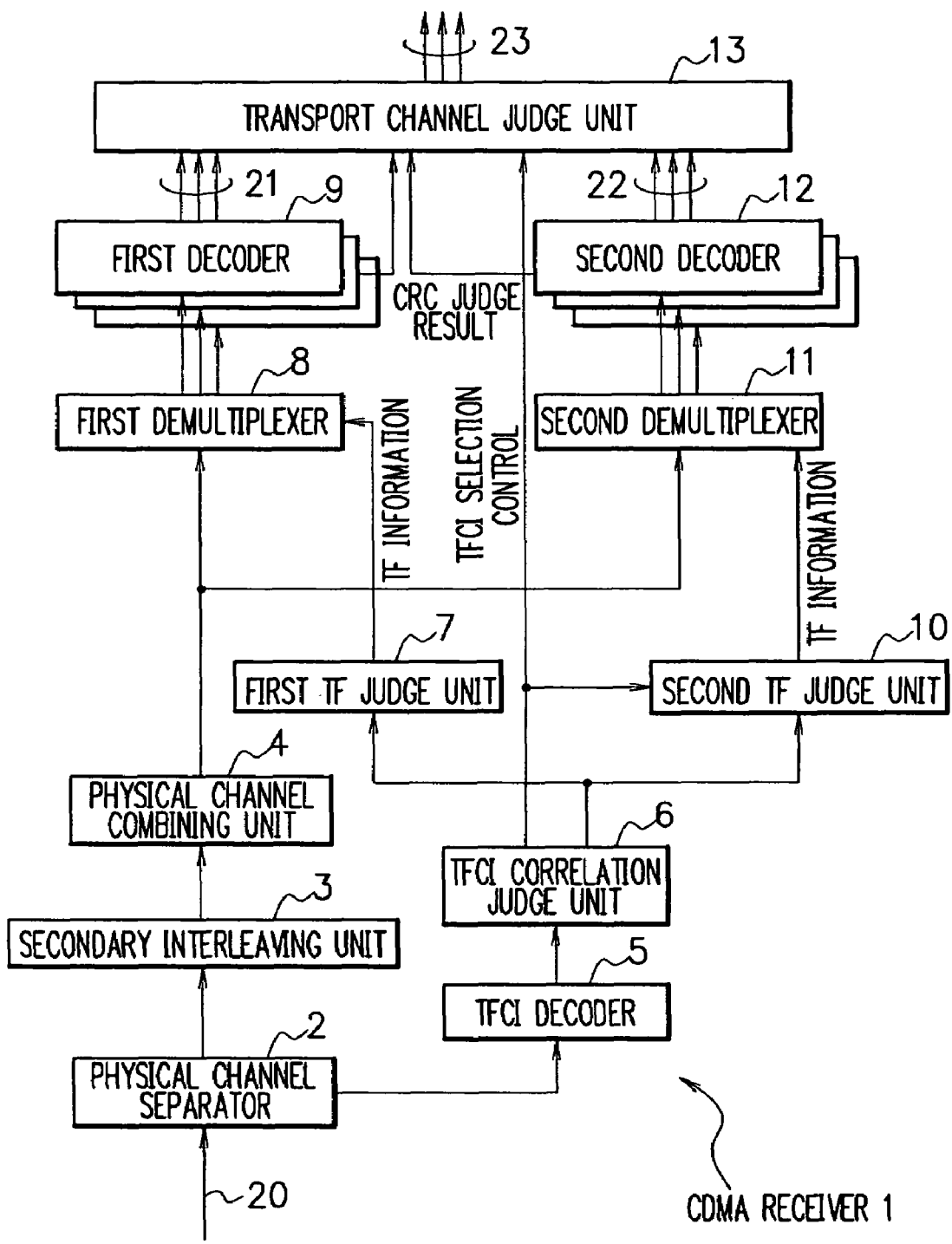
FIG. 1 is a schematic block diagram showing a configuration of a CDMA receiver in accordance with the present invention.

Referring first to FIG. 1, description will be given of a configuration of an embodiment of a CDMA receiver 1.

The CDMA receiver 1 includes a physical channel separator unit 2 which receives physical channel information 20 and which separates the information 20 into a data signal, a TFCI signal, a transport power control (TPC) signal, and a pilot signal. The data signal is fed to a secondary interleaving unit 3 and the TFCI signal is delivered to a TFCI decoder unit 5. The TPC and pilot signals are supplied to other functional blocks. However, these signals are not directly related to the present invention, and processing of the signals are known to those skilled in the art and hence are not described.

The secondary interleaving unit 3 rearranges the data signal for each physical channel and feeds the signal to a physical channel combining unit 4. The unit 4 combines a plurality of physical channel information items to produce a combined signal and delivers the signal to a first demultiplexing unit 8 and a second demultiplexing unit 11.

The TFCI decoder 5 decodes the TFCI signal using the Reed-Muller decoding scheme converting one 30-bit code word into ten-bit information to obtain decoded TFCI information. Since the Reed-Muller decoding is well known to those skilled in the art, detailed description thereof will be avoided. The TFCI decoder 5 obtains correlation values between the 1024 kinds of TFCI code sequences and the received TFCI signal. The TFCI information includes TFCI candidates and correlation values thereof. The decoded TFCI information is sent to the TFCI correlation judge unit 6.

The judge unit 6 compares a correlation distance threshold value $\Delta th$ with a TFCI correlation distance $\Delta n,m$ which is a correlation value difference between the largest TFCI value and the second largest TFCI value. If the TFCI correlation distance $\Delta n,m$ is less than the correlation distance threshold value $\Delta th$, the judge unit 6 assumes that the TFCI information is less credible and selects a concurrent decoding operation. The judge unit 6 supplies a TFCI selection control signal indicating whether or not the concurrent decoding operation is carried out to a second TF judge unit 10 and a transport channel format judge unit 13. By the TFCI selection control signal, the judge unit 6 sets a first TF judge unit 7 and the second TF judge unit 10 for this operation. If the concurrent decoding is not conducted, the judge unit 6 sets only the first TF judge unit 7 for operation using the TFCI selection control signal. The judge unit 6 does not issue any operation request to the second TF judge unit 10. That is, when it is not required to conduct the concurrent decoding, the second TF judge unit 10, the second demultiplexing unit 11, and the second decoder unit 12 do not operate.

The first TF judge unit 7 obtains transport format information for each transport channel from TFCI information of TFCI candidates selected by the TFCI correlation judge unit 6 and feeds the transport format information to the first demultiplexing unit 8. The second TF judge unit 10 similarly acquires transport format information for each transport channel from TFCI information of TFCI candidates selected by the judge unit 6 and sends the transport format information to the second demultiplexer 11.

According to the transport format information of TFCI candidates from the first TF judge unit 7, the first demultiplexer 8 divides the physical channel data signal from the physical channel combining unit 4 into the number of blocks and a block size for a transport channel and supplies these data items as transport channel data to the first decoder unit 9. According to the transport format information of TFCI candidates from the second TF judge unit 10, the second demultiplexer 11 splits the physical channel data signal from the combining unit 4 into the number of blocks and a block size for a transport channel and sends the data items as transport channel data to the second decoder unit 12.

The first and second decoders 9 and 12 decode signals for the respective channels and deliver decoded data items and CRC judge resultant signals 21 and 22 to a transport channel format judge unit 13.

When the TFCI selection control signal from the TFCI correlation judge unit 6 does not indicate that the concurrent decoding is required, the judge unit 13 feeds the decoded data and the CRC judge resultant signal 21 from the first decoder 9 directly to a higher layer.

Description will be given in detail of operation of the transport channel format judge unit 13 when concurrent decoding is to be conducted.

When the CRC judge resultant signal 21 from the first decoder 9 is OK, the judge unit 13 divides, according to the transport format information of TFCI candidates from the first TF judge unit 7, the physical channel data signal into the number of blocks and a block size for a transport channel and sends decoded transport channel data and the judge resultant signal 21 to a higher layer. When the resultant signal 21 from the first decoder 9 is NG and the CRC judge resultant signal 22 from the second decoder 12 is OK, the judge unit 13 splits, according to the transport format information of TFCI candidates from the second TF judge unit 10, the physical channel data signal into the number of blocks and a block size for a transport channel and delivers decoded transport channel data and the judge resultant signal 22 to a higher layer. When the signal 21 from the first decoder 9 is NG and the signal 22 from the second decoder 12 is NG, the judge unit 13 assumes that the transport channel data signal is wrong. According to the transport format information of TFCI candidates from the first TF judge unit 7, the judge unit 13 divides the physical channel data signal into the number of blocks and a block size for a transport channel and notifies decoded transport channel data and the event that the judge resultant signal 21 is NG to a higher layer.

Referring next to FIG. 2, description will be given of the configurations respectively of the first and second decoders 9 and 12. Since the decoders are configured substantially in the same way, description will be given only of the first decoder 9.

The first demultiplexer 8 supplies information of each transport channel. The wireless frame combining unit 31 combines data with a period of a transmission time interval. The primary interleaving unit 32 rearranges the obtained data for each transport channel. The rate matching unit 33 then adjusts the resultant data according to the number of blocks and the block size of the transport channel. The error correction and decoding unit 34 conducts a correction for the obtained data, specifically, for part of data lost under the wireless communication environment. The CRC judge unit 35 makes a check for each transfer block data of the transport channel to determine whether the CRC check results in OK or NG. This terminates the processing.

According to one aspect of the embodiment configured as above, the configuration is obtained by additionally disposing the TFCI correlation judge unit 6, the transport channel format judge unit 13 operating according to the CRC result, a plurality of demultiplexing units, and a plurality of decoders in the CDMA receiver for use with a mobile communication system using CDMA scheme.

Figure 3:
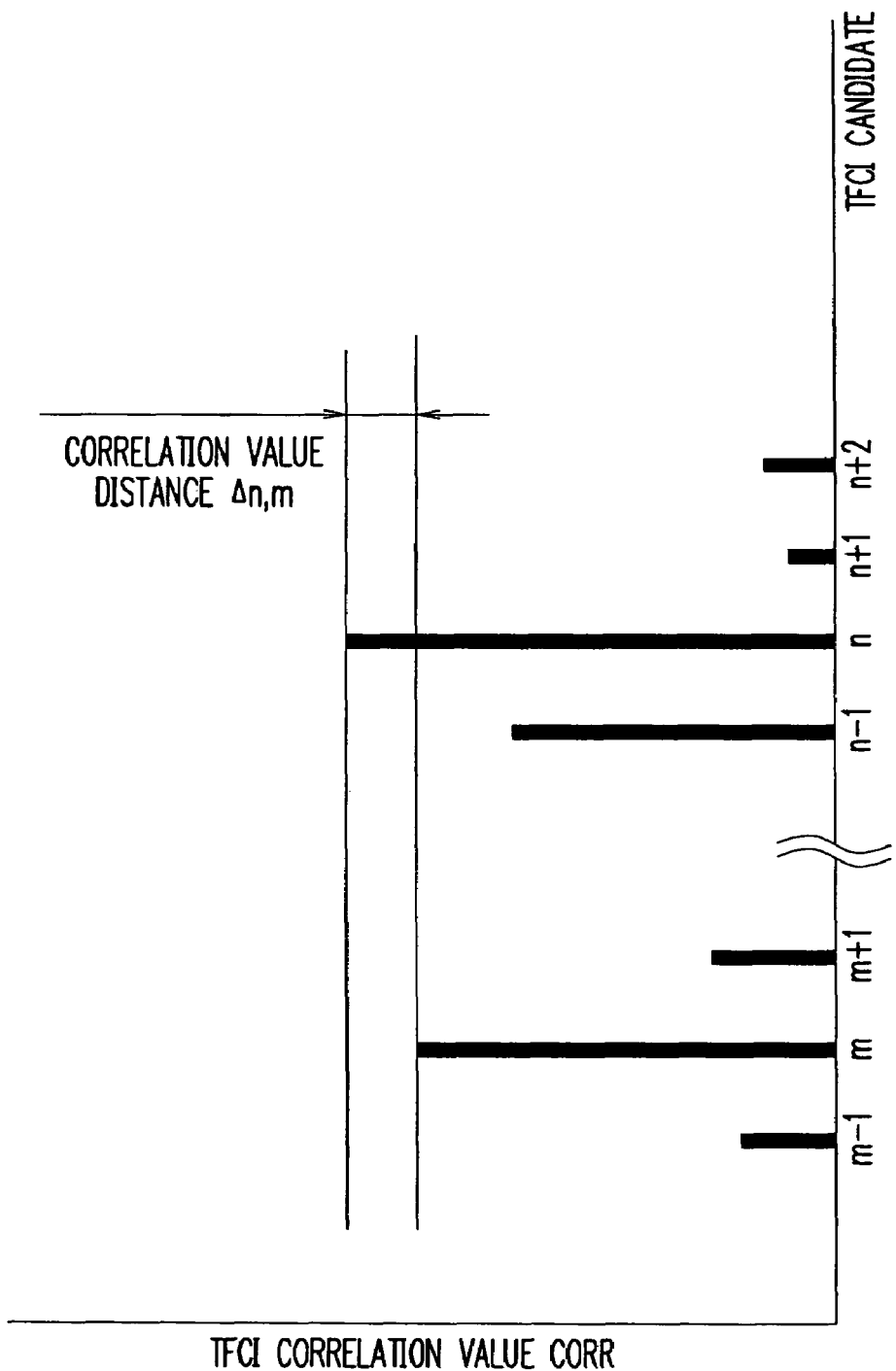
FIG. 3 is a graph showing TFCI candidates and TFCI correlation values.

As can be seen from FIG. 1, the TFCI decoder 5 of the CDMA receiver 1 of the embodiment produces a plurality of TFCI candidates and a plurality of correlation values respectively associated therewith. Assume in the description that the largest TFCI candidate value is TFCIn, the second largest TFCI candidate value is TFCIm, and the respectively corresponding correlation values are $Corr_n$ and $Corr_m$ as shown in FIG. 3.

When the difference between these TFCI correlation values, i.e., $\Delta n,m = Corr_n - Corr_m$ is less than the threshold value $\Delta th$, the largest TFCI candidate TFCIn is fed to the first TF judge unit 7. Therefore, the first demultiplexer 8 and the first decoder 9 decode the signals using the largest candidate TFCIn. The second largest TFCI candidate TFCIm is delivered to the second TF judge unit 10. The second demultiplexer 11 and the second decoder 12 conduct the decoding of the signals according to the second largest candidate TFCIm. The decoding operations are concurrently accomplished.

When the CRC judge result from the first decoder 9 is OK, the transport channel format judge unit 13 sends the CRC judge result and transport channel data resultant from the decoding operation using the transfer format information of TFCIn to a higher layer, not shown. When the CRC judge result from the first decoder 9 is NG and that from the second decoder 12 is OK, the judge unit 13 delivers the CRC judge result and transport channel data decoded adopting the transfer format information of TFCIm to the upper layer. When the CRC judge result from the first decoder 9 is NG and that from the second decoder 12 is NG, the judge unit 13 assumes that the data signal of the transport channel is wrong and reports data attained by decoding the transfer channel data using the transport format information associated with TFCIn and the CRC judge result to the higher layer.

As above, when TFCI candidates are less credible, for example, when the difference between TFCI correlation values is small, the embodiment decodes data employing the transport format information from a plurality of TFCI values having a higher TFCI correlation values. According to the CRC judge results, the embodiment selects a correct TFCI value to decode the data adopting the TFCI value and sends the decoded data to a higher layer. Consequently, the embodiment can report the data decoded using correct transport format information to the higher layer. This advantageously keeps high utilization efficiency of finite wireless resources.

Figure 4:
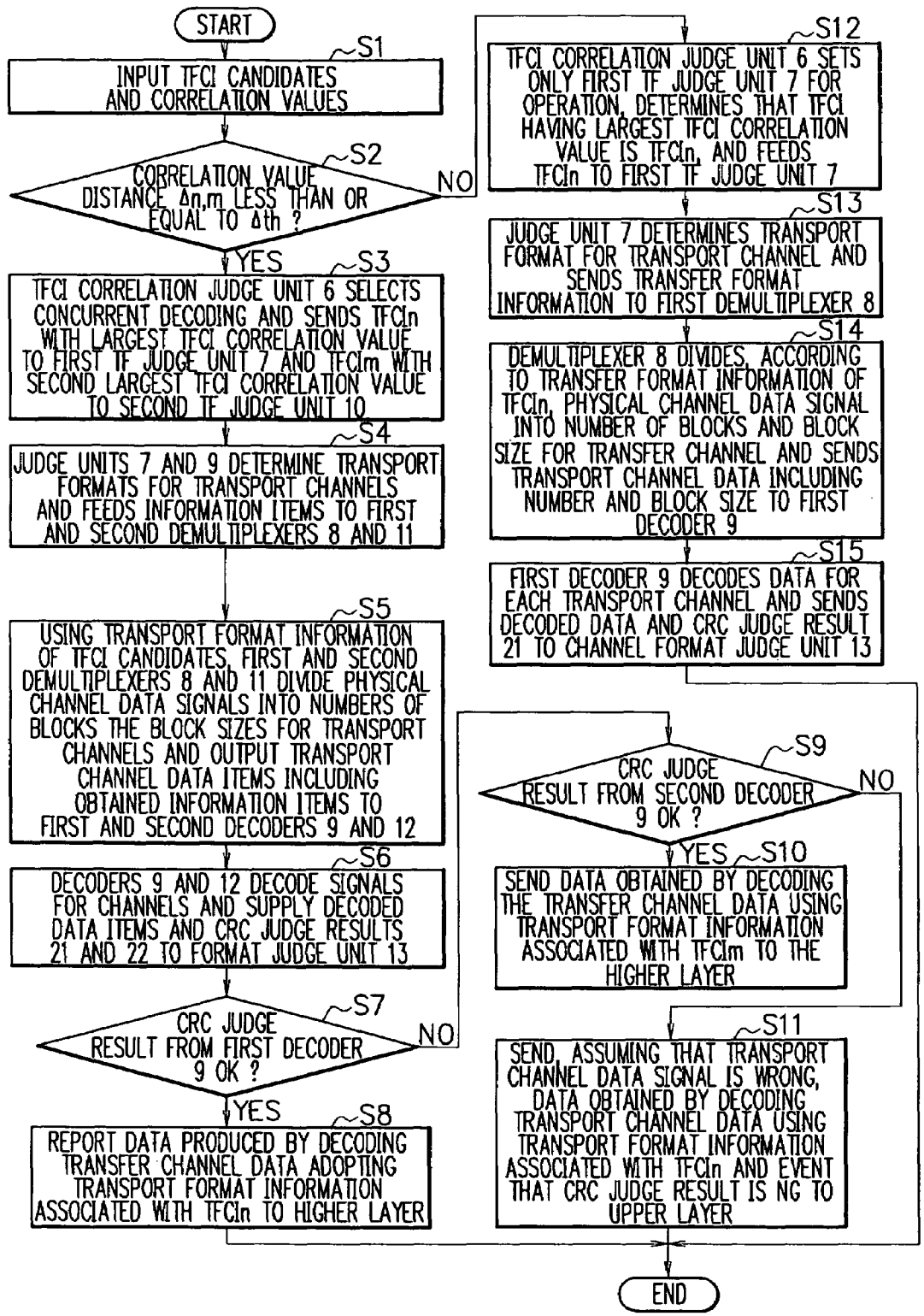
FIG. 4 is a flowchart showing a processing procedure of a first embodiment.
Figure 5:
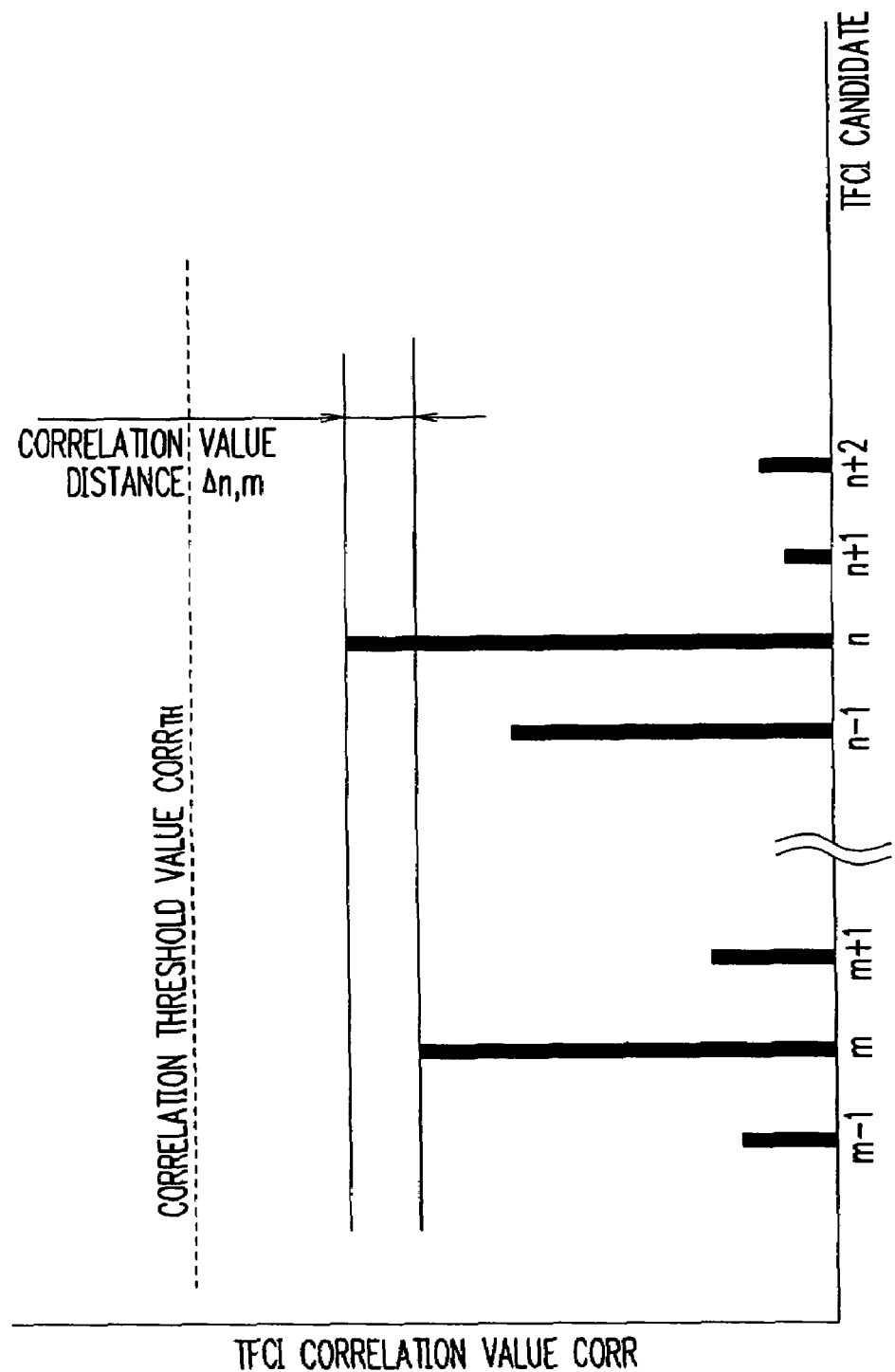
FIG. 5 is a graph showing TFCI candidates and TFCI correlation values as well as a relationship between correlation threshold values $Corr_{th}$ and TFCI correlation values.

Referring now to the flowchart of FIG. 4, description will be given of an operation procedure of the embodiment.

The TFC decoder 5 decodes the TFCI signal from the physical channel separator 2 into TFCI information including TFCI candidates and TFCI correlation values to be supplied to the TFCI correlation judge unit 6 (step s1).

The judge unit 6 makes a check to determine whether the difference $\Delta n,m$ between the largest TFCI correlation value and the second largest TFCI correlation value is less than the threshold value $\Delta th$ (step S2). If the TFCI correlation value distance $\Delta n,m$ is less than the threshold value $\Delta th$ (yes in step S2), the judge unit 6 selects a concurrent decoding operation by uses of a plurality of TFCI candidates and delivers a TFCI candidate TFCIn having the largest TFCI correlation value to the first TF judge unit 7 and a TFCI candidate TFCIm having the second largest TFCI correlation value to the second TF judge unit 10 (step S3). Execution of the concurrent decoding is notified by the TFCI selection control signal to the transport channel format judge unit 13 and the second TF judge unit 10.

Using TFCIn, the judge unit 7 determines a transport format for each transport channel and delivers transport format information including the transport format to the first demultiplexing unit 8 (step S4). According to TFCIm, the judge unit 10 determines a transport format for each transport channel and sends transport format information including the transport format to the second demultiplexer 11 (step S4).

Adopting the transport format information items respectively of the TFCI candidates, the first and second demultiplexers 8 and 11 respectively, divide the physical channel data signals into the numbers of blocks and the block sizes for the respective transport channels and then transmit transport channel data items respectively, including the obtained information items to the first and second decoders 9 and 12, respectively (step 5).

The decoders 9 and 12 decode signals for the respective channels and supply decoded data items and CRC judge results 21 and 22 to the transport channel format judge unit 13 (step S6).

The judge unit 13 checks the CRC judge result 21 obtained through the decoding operation utilizing TFCIn from the first decoder 9 (step S7). If the result is OK (yes in step S7), the judge unit 13 assumes that TFCI is TFCIn and then sends the CRC judge result 21 and data attained by decoding the transfer channel data using the transport format information associated with TFCIn to the higher layer (step S8).

If the result is NG in step S7 (no in step S7), the judge unit 13 checks the CRC judge result obtained through the decoding step using TFCIm with the second largest TFCI correlation value (step S9). If the CRC judge result is OK (yes in step S9), the judge unit 13 assumes that TFCI is TFCIm and then transfers the CRC judge result 22 and data attained by decoding the transfer channel data adopting the transport format information associated with TFCIm to the higher layer (step S10).

If the CRC judge result produced through the decoding operation using TFCIm is NG in step 9 (no in step 9), the judge unit 13 assumes that the transport channel data signal is wrong and transmits data obtained by decoding the transport channel data using the transport format information associated with TFCIn and "NG" indicating the CRC judge result to the upper layer (step S11).

If the correlation value distance $\Delta n,m$ is larger than the threshold value $\Delta th$ in step 2 (no in step S2), the TFCI correlation judge unit 6 assumes that TFCIn having the largest TFCI correlation value is TFCI and outputs TFCIn to the first TF judge unit 7. In this case, using the TFCI selection control signal, operation of the second TF judge unit 10 is inhibited (step S12).

The judge unit 7 delivers transfer format information of TFCIn to the first demultiplexing unit 8 (step S13). According to the transfer format information of TFCIn, the demultiplexer 8 divides the physical channel data signal into the number of blocks and a block size for the transfer channel and supplies transport channel data including these items to the first decoder 9 (step S14). The decoder 9 decodes the data for each transport channel and feeds resultant data and the CRC judge result 21 to the transport channel format judge unit 13 (step S15). In this situation, the obtained data and the CRC judge result are directly transferred to the higher layer.

Although the embodiment includes two sets of which each includes one demultiplexing unit and one decoding unit for concurrent operation, the number of sets of the demultiplexer and the decoder may be increased to carry out concurrent operation for three or more TFCI candidates. When the demultiplexer and the decoder have sufficiently a high processing speed, it is also possible to dispose one functional block to sequentially execute processing for TFCIn and TFCIm. That is, after TFCIn is processed, TFCIm is processed.

Referring next to the accompanying drawings, description will be given of a second embodiment in accordance with the present invention.

Although the second embodiment basically configured as described above, the TFCI correlation comparison in the TFCI correlation judge unit 6 is much more improved. In this embodiment, as can be seen from FIG. 5, only when the largest TFCI correlation value, i.e., $Corr_n$ is less than the correlation threshold value $Corr_{th}$, the concurrent decoding operation is accomplished by using the correlation value distance $\Delta n,m$.

Figure 6:
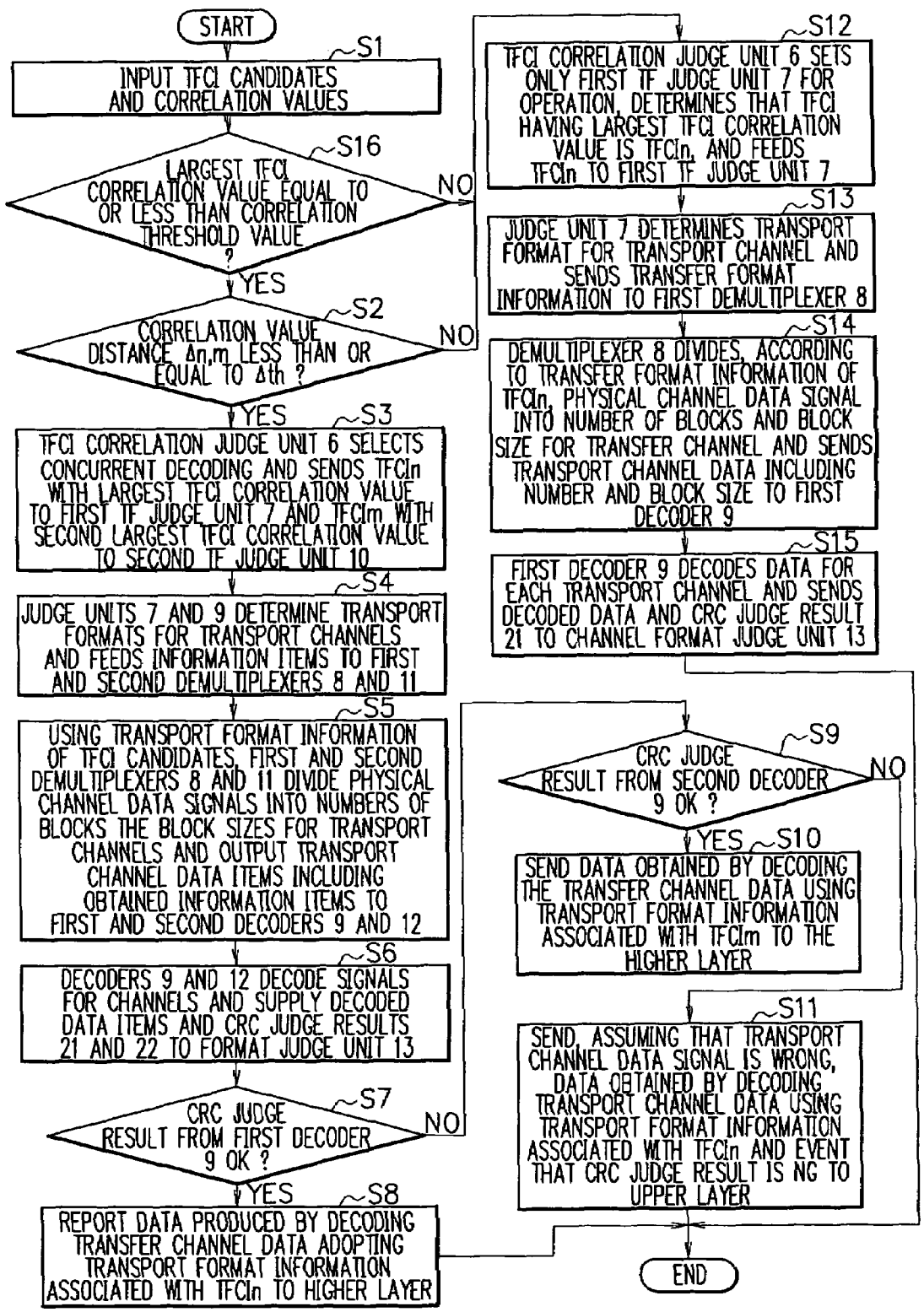
FIG. 6 is a flowchart showing a processing procedure of a second embodiment.

In this situation, FIG. 6 shows an operation procedure of the CDMA receiver using the TFCI correlation judging scheme described above. When the TFCI correlation value $Corr_n$ is more than the correlation threshold value, it is assumed that a sufficiently high correlation exists between the TFCI candidate TFCIn and the TFCI signal, and hence the concurrent decoding is not conducted. That is, this embodiment reduces the processing time in the decoding section. As a result, power consumed by the decoding section become smaller and the communication time of the CDMA receiver is advantageously elongated.

Description has been given of the embodiments as only examples to which the present invention is suitably applicable. However, the present invention is not restricted by the embodiments. The embodiments can be modified and changed in various ways within a scope of the present invention.

As can be seen from the description above, when the difference between TFCI correlation values is small, namely, TFCI candidates are less credible or have low credibility, data is decoded using transport format information according to a plurality of TFCI candidates having a high TFCI correlation value to select an appropriate TFCI candidate according to a CRC judge result. Data decoded using the appropriate TFCI is notified to the higher layer. Therefore, data decoded according to correct transfer format information is reported to the upper layer. As a result, it is possible to keep high utilization efficiency of finite wireless resources.

When the correlation value distance is less than the threshold value, the concurrent processing is not executed. Transport format information is determined according to the TFCI candidate having the largest TFCI correlation value and the decoding operation is carried out using the transport format information. This prevents initiation of the concurrent processing in any case in which the concurrent processing is not required. As a result, there can be provided a CDMA receiver requiring less power.

Only when the largest TFCI correlation value is less than the second threshold value, the correlation value distance between the TFCI correlation value of the TFCI candidate having the largest TFCI correlation value and that of the TFCI candidate having the next largest TFCI correlation value is compared with the first threshold value. According to a result of the comparison, whether or not the decoding operation is concurrently carried out is determined. This reduces the chance or frequency of initiating the concurrent processing and hence it is possible to provide a CDMA receiver operating with lower power consumption.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A coded division multiple access (CDMA) receiver for use with a CDMA mobile communication system, comprising:

transport format combination indicator (TFCI) decoding means for obtaining correlation values between a TFCI signal associated with transfer format information of data and a predetermined TFCI code sequence; and TFCI correlation judging means for comparing a first threshold value with a correlation value distance represented by a difference between a TFCI correlation value of a TFCI candidate having a largest TFCI correlation value obtained by the TFCI decoding means and a TFCI correlation value of a TFCI candidate having a next largest TFCI correlation value obtained by the TFCI decoding means and conducting a control operation in which when the correlation value distance is less than the first threshold value, decoding processing of decoding data of a physical channel into a data of a transport channel according to the transport format information of the TFCI candidate is concurrently executed using transport format information items of a plurality of TFCI candidates, wherein when the correlation value distance is less than the first threshold value, the decoding processing is concurrently executed using transport format information items of the TFCI candidates, the receiver further comprising transport channel format judging means for making a check to determine whether or not a cyclic redundancy check (CRC) judge result obtained from the decoding processing is normal and reporting to a higher layer the CRC judge result and data of a transfer channel obtained by decoding data of a physical channel according to transfer format information associated with a TFCI candidate for which the CRC judge result is normal.

2. A CDMA receiver for use with a CDMA mobile communication system, comprising:

TFCI decoding means for obtaining correlation values between a TFCI signal associated with transfer format information of data and a predetermined TFCI code sequence;

TFCI correlation judging means for comparing a first threshold value with a correlation value distance represented by a difference between a TFCI correlation value of a TFCI candidate having a largest TFCI correlation value obtained by the TFCI decoding means and a TFCI correlation value of a TFCI candidate having a next largest TFCI correlation value obtained by the TFCI decoding means and conducting a control operation in which when the correlation value distance is less than the first threshold value, decoding processing of decoding data of a physical channel into a data of a transport channel according to the transport format information of the TFCI candidate is concurrently executed using transport format information items of a plurality of TFCI candidates;

first demultiplexing means for dividing data of a physical channel into a number of blocks and a block size of a transport channel according to the transport format information of the TFCI candidate having the largest TFCI correlation value and delivering data of the transport channel;

first decoding means for decoding the data of the transport channel from the first demultiplexing means and outputting data thus decoded and a CRC judge result;

second demultiplexing means for dividing data of a physical channel into a number of blocks and a block size of a transport channel according to the transport format information of the TFCI candidate having the next largest TFCI correlation value and delivering data of the transport channel;

second decoding means for decoding the data of the transport channel from the second demultiplexing means and outputting data thus decoded and a CRC judge result; and transport channel format judging means for determining whether or not each of the CRC judge results obtained respectively from the first and second decoding means is normal and reporting to a higher layer the CRC judge result and data of a transfer channel obtained by decoding data of a physical channel according to transfer format information associated with a TFCI candidate for which the CRC judge result is normal.

3. A CDMA receiver in accordance with claim 2, wherein:

the TFCI correlation judging means conducts a control operation to inhibit operation of the second demultiplexing means and the second decoding means when the correlation value distance is larger than the first threshold value;

the TFCI correlation judging means delivers the data of the transport channel by the first demultiplexing means, the data being obtained by dividing the data of a physical channel into a number of blocks and a block size of the transport channel according to the transport format information of the TFCI candidate having the largest TFCI correlation value;

the TFCI correlation judging means decodes by the first decoding means the data of the transport channel from the first demultiplexing means and thereby outputs data thus decoded and a CRC judge result; and the transport channel format judging means reports the data decoded by the first decoding means and the CRC judge result to the higher layer.

4. A CDMA receiver in accordance with claim 2, wherein the TFCI correlation judging means compares the TFCI correlation value of the TFCI candidate having the largest TFCI correlation value with a second threshold value; compares, when the TFCI correlation value is smaller than the second threshold value, a difference between the TFCI correlation value of the TFCI candidate having the largest TFCI correlation value obtained by the TFCI decoding means and that of the TFCI candidate having the next largest TFCI correlation value with the first threshold value; and thereby determines whether or not the decoding processing is to be concurrently executed.

5. A CDMA receiver in accordance with claim 3, wherein the TFCI correlation judging means compares the TFCI correlation value of the TFCI candidate having the largest TFCI correlation value with a second threshold value; compares, when the TFCI correlation value is smaller than the second threshold value, a difference between the TFCI correlation value of the TFCI candidate having the largest TFCI correlation value obtained by the TFCI decoding means and that of the TFCI candidate having the next largest TFCI correlation value with the first threshold value; and thereby determines whether or not the decoding processing is to be concurrently executed.

6. A method of judging TFCI candidates of a CDMA receiver for use with a CDMA mobile communication system, comprising:

a TFCI decoding step of obtaining correlation values between a TFCI signal associated with transfer format information of data and a predetermined TFCI code sequence;

a correlation value distance comparing step of comparing a first threshold value with a correlation value distance represented by a difference between a TFCI correlation value of a TFCI candidate having a largest TFCI correlation value obtained by the TFCI decoding step and a TFCI correlation value of a TFCI candidate having a next largest TFCI correlation value obtained by the TFCI decoding step;

a step of conducting, when the correlation value distance is less than the first threshold value, an operation in which decoding processing of decoding data of a physical channel into a data of a transport channel according to the transport format information of the TFCI candidate is concurrently executed using transport format information items of a plurality of TFCI candidates;

a step of concurrently executing, when the correlation value distance is less than the first threshold value, the decoding processing using transport format information items of the TFCI candidates; and a transport channel format judging step of making a check to determine whether or not a CRC judge result obtained from the decoding processing is normal and reporting to a higher layer the CRC judge result and data of a transfer channel obtained by decoding data of a physical channel according to transfer format information associated with a TFCI candidate for which the CRC judge result is normal.

7. A method of judging TFCI candidates of a CDMA receiver for use with a CDMA mobile communication system, comprising:

a TFCI decoding step of obtaining correlation values between a TFCI signal associated with transfer format information of data and a predetermined TFCI code sequence;

a correlation value distance comparing step of comparing a first threshold value with a correlation value distance represented by a difference between a TFCI correlation value of a TFCI candidate having a largest TFCI correlation value obtained by the TFCI decoding step and a TFCI correlation value of a TFCI candidate having a next largest TFCI correlation value obtained by the TFCI decoding step;

a first demultiplexing step of dividing data of a physical channel into a number of blocks and a block size of a transport channel according to the transport format information of the TFCI candidate having the largest TFCI correlation value and delivering data of the transport channel;

a first decoding step of decoding the data of the transport channel from the first demultiplexing step and outputting data thus decoded and a CRC judge result;

a second demultiplexing step of dividing data of a physical channel into a number of blocks and a block size of a transport channel according to the transport format information of the TFCI candidate having the next largest TFCI correlation value and delivering data of the transport channel;

a second decoding step of decoding the data of the transport channel from the second demultiplexing step and outputting data thus decoded and a CRC judge result;

a concurrent processing indicating step of indicating, when the correlation value distance comparing step determines that the correlation value distance is less than the first threshold value, concurrent execution of first decoding processing by the first demultiplexing step and the first decoding step and second decoding processing by the second demultiplexing step and the second decoding step; and a transport channel format judging step of determining whether or not each of the CRC judge results obtained respectively from the first and second decoding steps is normal and reporting to a higher layer the CRC judge result and data of a transfer channel obtained by decoding data of a physical channel according to transfer format information associated with a TFCI candidate for which the CRC judge result is normal.

8. A method of judging TFCI candidates of a CDMA receiver in accordance with claim 7, wherein:

the concurrent processing indicating step further includes a step of inhibiting execution the second demultiplexing step and the second decoding step when the correlation value distance is larger than the first threshold value; and the first demultiplexing step further includes a step of delivering the data of the transport channel, the data being obtained by dividing the data of a physical channel into a number of blocks and a block size of the transport channel according to the transport format information of the TFCI candidate having the largest TFCI correlation value, the first decoding step decoding the data of the transport channel from the first demultiplexing step and thereby outputting data thus decoded and a CRC judge result, the transport channel format judging step reporting the data decoded by the first decoding step and the CRC judge result to the higher layer.

9. A method of judging TFCI candidates of a CDMA receiver in accordance with claim 7, further comprising;

a TFCI correlation value judging step of comparing the TFCI correlation value of the TFCI candidate having the largest TFCI correlation value with a second threshold value; and the correlation value distance comparing step compares, when the TFCI correlation value judging step determines that the TFCI correlation value is smaller than the second threshold value, a difference between the TFCI correlation value of the TFCI candidate having the largest TFCI correlation value and that of the TFCI candidate having the next largest TFCI correlation value with the first threshold value and thereby determining whether or not the decoding processing is to be concurrently executed.

10. A method of judging TFCI candidates of a CDMA receiver in accordance with claim 8, further comprising;

a TFCI correlation value judging step of comparing the TFCI correlation value of the TFCI candidate having the largest TFCI correlation value with a second threshold value; and the correlation value distance comparing step compares, when the TFCI correlation value judging step determines that the TFCI correlation value is smaller than the second threshold value, a difference between the TFCI correlation value of the TFCI candidate having the largest TFCI correlation value and that of the TFCI candidate having the next largest TFCI correlation value with the first threshold value and thereby determining whether or not the decoding processing is to be concurrently executed.

* * * * *